United States Patent
Padmanabhan et al.

(10) Patent No.: US 7,346,679 B2
(45) Date of Patent: Mar. 18, 2008

(54) METHOD AND SYSTEM FOR IDENTIFYING LOSSY LINKS IN A COMPUTER NETWORK

(75) Inventors: Venkata N. Padmanabhan, Bellevue, WA (US); Lili Qiu, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1018 days.

(21) Appl. No.: 10/356,059

(22) Filed: Jan. 31, 2003

(65) Prior Publication Data

US 2004/0044764 A1  Mar. 4, 2004

Related U.S. Application Data

(60) Provisional application No. 60/407,425, filed on Aug. 30, 2002.

(51) Int. Cl.
*G06F 15/173* (2006.01)
*G06F 7/00* (2006.01)

(52) U.S. Cl. .................... 709/224; 370/236.1
(58) Field of Classification Search ............. 709/224; 370/236.1; 379/112.1; 714/47
See application file for complete search history.

(56) References Cited

U.S. PATENT DOCUMENTS

| | | | |
|---|---|---|---|
| 6,195,622 B1 | 2/2001 | Altschuler et al. | |
| 6,606,301 B1 * | 8/2003 | Muller et al. | 370/230 |
| 6,725,025 B1 | 4/2004 | Schmidl et al. | |
| 6,839,754 B2 | 1/2005 | Nowak et al. | |
| 7,072,811 B2 | 7/2006 | Kadane et al. | |
| 7,095,979 B2 | 8/2006 | Stout | |
| 2002/0016699 A1 | 2/2002 | Hoggart et al. | |
| 2002/0055913 A1 | 5/2002 | Rajan | |
| 2004/0044759 A1 | 3/2004 | Padmanabhan | |
| 2004/0044765 A1 | 3/2004 | Meek et al. | |

OTHER PUBLICATIONS

Comparative Performance Analysis of Versions of TCP in a Local Network with a Lossy Link, Kumar, A., IEEE/ACM Transactions on Nertworking, vol. 6, No. 4, Aug. 1998.*
Loss-based inference of multicast network topology, Caceres, R. et. al., Decision and Control, Proc. of the 38th IEEE, 1999, Conf vol. 3, pp. 3065-3070, ISBN: 0-7803-5250-5.*
Multicast topology inference from measured end-to-end loss, Duffield, N.G. et. al., Information Theory, IEEE Transactions, vol. 48, Issue 1, Jan. 2002, pp. 26-45, ISSN: 0018-9448.*
Passive Network Tomography Using Bayesian Inference, Venkata N. Padmanabhan, Lili Qiu, and Helen J. Wang, Microsoft Research, 2002.*

(Continued)

*Primary Examiner*—Zarni Maung
(74) *Attorney, Agent, or Firm*—Wolf, Greenfield & Sacks, P.C.

(57) ABSTRACT

A computer network has links for carrying data among computers, including one or more client computers. Packet loss rates are determined for the client computers and, based on the loss rates, a number of possible sets of solutions for the loss rates at each of the links are generated. The sets of possible solutions are subjected to a statistical analysis. Based on the results of the analysis, a determination is made regarding which of the links are excessively lossy.

3 Claims, 4 Drawing Sheets

OTHER PUBLICATIONS

Network Tomography on General Topologies, T. Bu and N. Duffield and F. Presti and D. Towsley, vol. 1, Issue 1, Jun. 2002, ISSN:0163-5999.*

Scaling Multicast Transports through end-to-end toplogy discovery, Ratnasamy, S., dissertation, 1997.*

Estimation of Network Link Loss Rates Via Chaining In Multicast Trees, A. Ziotopoulos and A. Hero and W. Wasserman, ICASSP 2001.*

M. Coates and R. Nowak, "Network loss inference using unicast end-to-end measurement," ITC Seminar on IP Traffic, Measurement and Modelling Monterey, CA, pp. 28:1-28:9, Sep. 2000.*

Qui, Lili, et al., "Server-Centric View of Internet Performance: Analysis and Implications", Microsoft Research, Technical Report MSR-TR-2001-78, pp. 1-16, Sep. 2001.

Padmanabhan, Venkat, et al., "Server-Based Characterization and Inference of Internet Performance", Microsoft Research, *UCLA/IPAM Workshop* (Mar. 2002), 29 pages.

Padmanabhan, Venkat., et al., "Server-Based Inference of Internet Performance", *Technical Report MSR-TR-2002-39*, Microsoft Research, Microsoft Corporation (May 2002), 15 pages.

Allman, Mark, "A Web Server's View of the Transport Layer", *Computer Communication Review, ACM SIGCOMM*, vol. 30, No. 5 (Oct. 2000), pp. 10-20.

Balakrishnan, Hari, et al., "Analyzing Stability in Wide-Area Network Performance", in *Proceedings of The 1997 ACM Sigmetrics International Conference on Measurement and Modeling of Computer Systems*, Performance Evaluation Review, Special Issue vol. 25, No. 1 (Jun. 1997), pp. 2-12.

Caceres, R., et al., "Multicast-Based Inference of Network-Internal Characteristics: Accuracy of Packet Loss Estimation", in *Proceedings of IEEE INFOCOM '99: The Conference on Computer Communications*, vol. 1, Eighteenth Annual Joint Conference of the IEEE Computer and Communications Societies (Mar. 1999), pp. 371-379.

"Cisco Distributed Director" retrieved from http://www.cisco.com/warp/public/cc/pd/cxsr/dd/index.shtml on Mar. 13, 2002, 1 page.

Downey, Allen, "Using Pathchar to Estimate Internet Link Characteristics", in *ACM SIGCOMM '99 Conference: Applications, Technologies, Architectures, and Protocols for Computer Communications* (1999), pp. 241-250.

Duffield, N.G., et al., "Inferring Link Loss Using Striped Unicast Probes", in *Proceedings of IEEE INFOCOM '2001 The Conference on Computer Communications*, vol. 2 of 3, Twentieth Annual Joint Conference of the IEEE Computer and Communications Societies (Apr. 2001), pp. 915-923.

Fraleigh, Chuck, et al., "Packet-Level Traffic Measurements from a Tier-1 IP Backbone", *Sprint Technical Report TR-01-110101*, 10 pages.

Geman, Stuart, et al., "Stochastic Relaxation, Gibbs Distributions and the Bayesian Restoration of Images", in *IEEE Transactions on Pattern Analysis and machine Intelligence*, vol. PAMI-6, No. 6 (Nov. 1984), pp. 721-741.

Gilks, W.R., et al., "*Markov Chain Monte Carlo in Practice*", Chapman & Hall/CRC, Boca Raton, Florida (1996), pp. 1-486.

"TCPDUMP"—retrieved from http://www.dia.uniroma3.it/~valecchi/appendice/tcpdump.html on Apr. 23, 2003, 13 pages.

Katabi, Dina, et al., "A Passive Approach for Detecting Shared Bottlenecks", in *Proceedings of the 10th International Conference on Computer Communications and Networks* (Oct. 2001), pp. 174-181.

Krishnamurthy, Balachander, et al., "On Network-Aware Clustering of Web Clients", in *Proceedings of ACM SIGCOMM '2000 Conference on Applications, Technologies, Architectures and Protocols for Computer Communication* (Aug. 2000), pp. 97-110.

Mogul, Jeffrey, et al., "Potential Benefits of Delta Encoding and Data Compression for HTTP", in *Proceedings of ACM SIGCOMM '97 Conference on Applications, Technologies, Architectures, and Protocols for Computer Communication* (Sep. 1997), pp. 181-194.

Padhye, Jitendra, et al., "Modeling TCP Throughput: A Simple Model and Its Empirical Validation", in *Proceedings of ACM SIGCOMM '98 Proceedings on Applications, Technologies, Architectures, and Protocols for Computer Communications* (Aug. 1998), pp. 303-314.

Paxson, Vern, "End-to-End Internet Dynamics", in *Proceedings of ACM SIGCOMM '97 Conference on Applications, Technologies, Architectures, and Protocols for Computer Communication* (Sep. 1997), pp. 139-152.

Ratnasamy, Sylvia, et al., "Inference of Multicast Routing Trees and Bottleneck Bandwidths Using End-to-End Measurements", in *Proceedings of IEEE INFOCOM '99 The Conference on Computer Communications*, vol. 1, Eighteenth Annual Joint Conference of the IEEE Computer and Communications Societies (Mar. 1999), pp. 353-360.

Rubenstein, Dan, et al., "Detecting Shared Congestion of Flows via End-to-End Measurement", in *Proceedings of ACM SIGMETRICS*, '2000 International Conference on Measurement and Modeling of Computer Systems (Jun. 2000), pp. 145-155.

Seshan, Srinivasan, et al., "SPAND: Shared Passive Network Performance Discovery", in *Proceedings of 1st USENIX Symposium on Internet Technologies and Systems* (Dec. '97), pp. 135-146.

Tsang, Yolanda, et al., "Passive Network Tomography Using EM Algorithms", in *Proceedings of the IEEE International Conference on Acoustics, Speech, and Signal Processing*, vol. III or VI (May 2001), pp. 1469-1472.

Zhang, Yin, et al., "On the Constancy of Internet Path Properties", in *Proceedings of ACM SIGCOMM Internet Measurement Workshop* (Nov. 2001), pp. 197-211.

Zhang, Yin, et al., "The Stationarity of Internet Path Properties: Routing Loss, and Throughput", *Computer Science Department*, Cornell University (May 2000), 14 pages.

Nahum, Erich, M., et al., "The Effects of Wide-Area Conditions on WWW Server Performance", in *Proceedings of ACM SIGMETRICS 2001/Performance 2001, Performance Evaluation Review* (Jun. 2001), vol. 29, No. 1, pp. 257-267.

Office Action mailed Feb. 21, 2007 for U.S. Appl. No. 10/360,282.

Final Office Action mailed Aug. 10, 2007 for U.S. Appl. No. 10/360,282.

Office Action mailed Sep. 8, 2006 for U.S. Appl. No. 10/378,332.

Office Action mailed Feb. 21, 2007 for U.S. Appl. No. 10/378,332.

Advisory Action mailed May 29, 2007 for U.S. Appl. No. 10/378,332.

* cited by examiner

METHOD AND SYSTEM FOR IDENTIFYING LOSSY LINKS IN A COMPUTER NETWORK

RELATED CASES

This application is based on provisional application No. 60/407,425, filed Aug. 30, 2002, entitled "Method and System for Identifying Lossy Links in a Computer Network."

TECHNICAL FIELD

The invention relates generally to network communications and, more particularly, to methods and systems for identifying links in a computer network that are experiencing excessive data loss.

BACKGROUND

Computer networks, both public and private, have grown rapidly in recent years. A good example of a rapidly growing public network is the Internet. The Internet is made of a huge variety of hosts, links and networks. The diversity of large networks like the Internet presents challenges to servers operating in such networks. For example, a web server whose goal is to provide the best possible service to clients must contend with performance problems that vary in their nature and that vary over time. For example performance problems result from network delays, poor throughput and high incidents of packet losses. These problems are measurable, but it is difficult to pinpoint the portion of a large network that is responsible for the problems observed at either the client or the server.

Many techniques currently exist for measuring network performance. Some of the techniques are active, in that they involve injecting data traffic into the network in the form of pings, traceroutes, and TCP connections. Other techniques are passive in that they involve analyzing existing traffic by using server logs, packet sniffers, and the like. Most of these techniques measure end-to-end performance. That is, they measure the aggregate performance of the network from a server to a client, including all of the intermediate, individual network links, and make no effort made to distinguish among the performance of individual links. The few techniques that attempt to infer the performance of portions of the network (e.g., links between nodes) typically employ active probing (i.e., inject additional traffic into the network), which would place an additional burden on the network.

SUMMARY

In accordance with the foregoing, a method and system for identifying lossy links in a computer network is provided. According to various embodiments of the invention, the computer network has links for carrying data among computers, including one or more client computers. End-to-end packet loss rates are determined for the client computers and, based on the loss rates, a number of possible sets of solutions for the loss rates at each of the links are generated. The sets of possible solutions are subjected to a statistical analysis. Based on the results of the analysis, a determination is made regarding which of the links are likely to be excessively lossy Additional aspects of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

DETAILED DESCRIPTION

Prior to proceeding with a description of the various embodiments of the invention, a description of the computer and networking environment in which the various embodiments of the invention may be practiced will now be provided. Although it is not required, the invention is preferably realized as software executing on a computer. Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
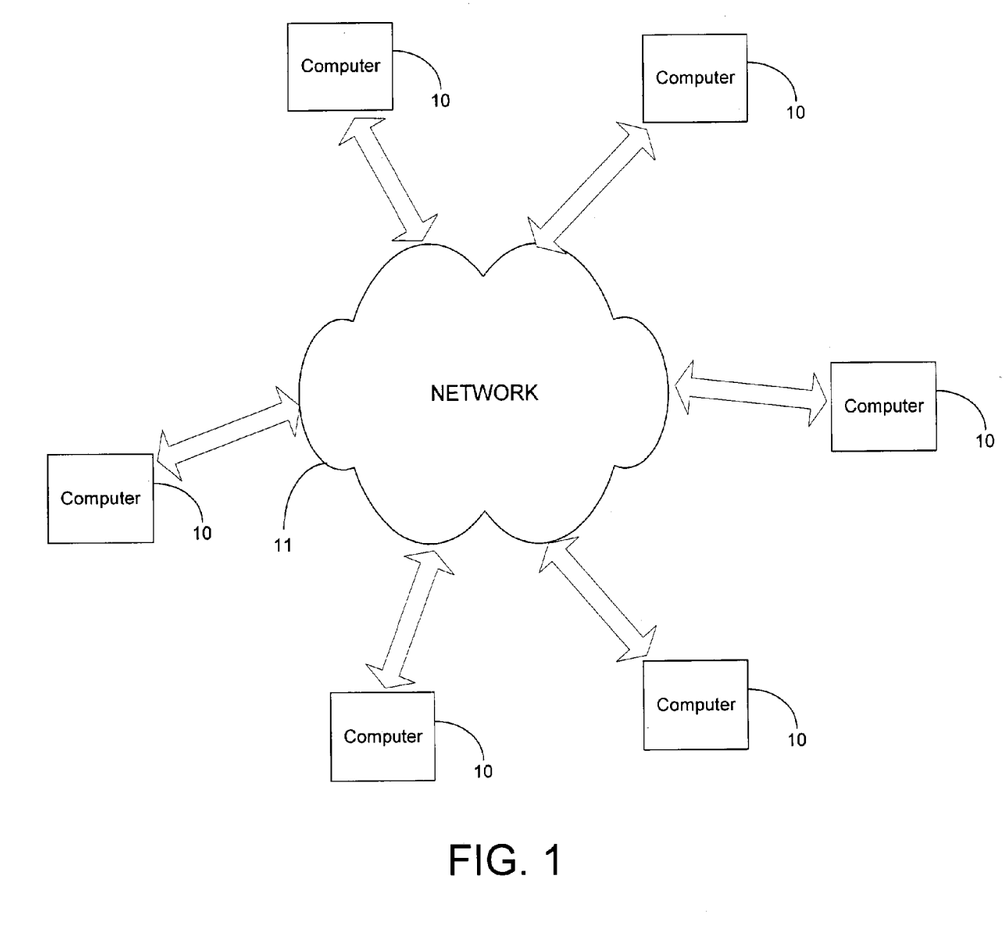
FIG. 1 illustrates an example of a computer network in which the invention may be practiced.

An example of a networked environment in which the invention may be used will now be described with reference to FIG. 1. The example network includes several computers 10 communicating with one another over a network 11, represented by a cloud. Network 11 may include many well-known components, such as routers, gateways, hubs, etc. and allows the computers 10 to communicate via wired and/or wireless media. When interacting with one another of the network 11, one or more of the computers may act as clients, servers or peers with respect to other computers. Accordingly, the various embodiments of the invention may be practiced on clients, servers, peers or combinations thereof, even-though specific examples contained herein don't refer to all of these types of computers.

Figure 2:
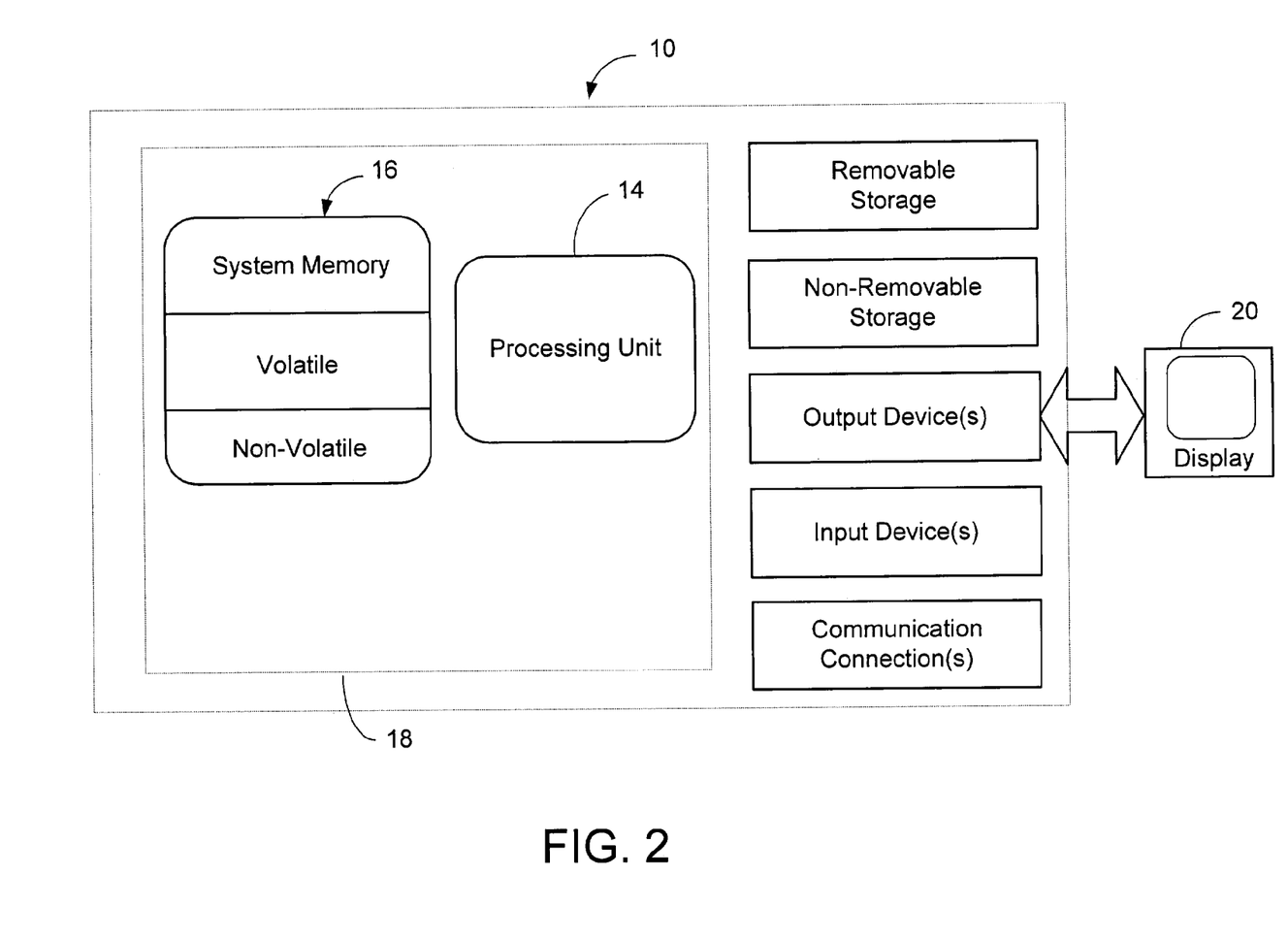
FIG. 2 illustrates an example of a computer on which at least some parts of the invention may be implemented.

Referring to FIG. 2, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (removable and/or non-removable) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

Computer 10 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term "computer-readable medium" as used herein includes both computer storage media and communication media.

Computer 10 may also have input devices such as a keyboard, mouse, pen, voice input device, touch input device, etc. Output devices such as a display 20, speakers, a printer, etc. may also be included. All these devices are well known in the art and need not be discussed at length here.

The invention is generally directed to identifying lossy links on a computer network based on passive observation of client-server communication made at a server. Identifying lossy links is challenging for a variety of reasons. First, characteristics of a computer network may change over time. Second, even when the loss rate of each link is constant, it may not be possible to definitively identify the loss rate of each link based just on end-point observations. For example, given M clients and N links, there are M constraints (corresponding to each server—end node path) defined over N variables (corresponding to the loss rate of the individual links). For each client $C_j$, there is a constraint of the form $1-\Pi_{i \in T_j}(1-l_i)=p_j$, where $T_j$ is the set of links on the path from the server to the client $C_j$, $l_i$ is the loss rate of link i, and $p_j$ is the end-to-end loss rate between the server and the client $C_j$. If M' N, as is often the case, there is not a unique solution to this set of constraints.

Turning again to the invention, the system and method described herein is intended for use on computer networks, and may be employed on a variety of topologies. The various embodiments of the invention and example scenarios contained herein are described in the context of a tree topology. However, the invention does not depend on the existence of a tree topology.

Figure 3:
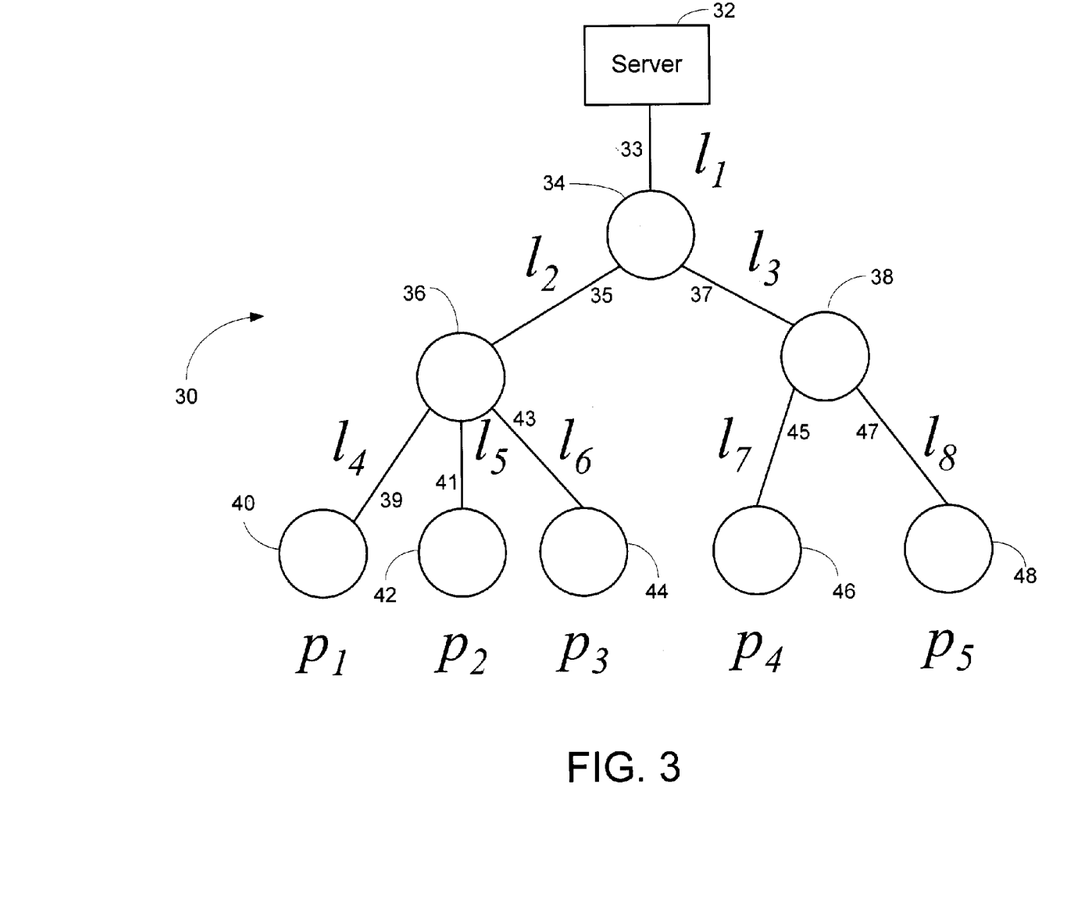
FIG. 3 illustrates a computer network in which an embodiment of the invention is used.

Referring to FIG. 3, a computer network 30, having a tree topology, is shown. The computer network 30 includes a server 32 and client computers 34, 36, 38, 40, 42, 44, 46 and 48. The client computers include a first client computer 34, a second client computer 36 and a third client computer 38. The client computers of the network 30 also include a first end node 40, a second end node 42, and third end node 44, a fourth end node 46 and a fifth end node 48. Each end node has a loss rate $p_j$ associated with it. The loss rate $p_j$ is the rate at which data packets are lost when traveling end-to-end between the server 32 and the end node. This end-to-end loss rate $p_j$ is estimated by a well-known method, such as by observing transport control protocol (TCP) data packets and ACKs at the server to identify packet retransmissions triggered by packet loss.

The network 30 also includes network links 33, 35, 37, 39, 41, 43, 45 and 47. Each network link has a packet loss rate $l_i$ associated with it. The packet loss rate $l_i$ of a link is the probability of data packets, (e.g., IP packets) getting dropped at the link. As will be described below, the invention is to use the end-to-end packet loss rate $p_j$ to infer the link loss rate $l_i$ (which may not be exactly equal to the actual packet loss rate for the link, but is likely to be close) so as to determine whether the link is lossy.

Table 1 shows the meaning of the variables used in FIG. 3.

TABLE 1

| Variable | Meaning |
| --- | --- |
| $L_1$ | loss rate of the link 33 between the server 32 and the first client computer 34 |
| $L_2$ | loss rate of the link 35 between the first client computer 34 and the second client computer 36 |
| $L_3$ | loss rate of the link 37 between the first client computer 34 and the third client computer 38 |
| $L_4$ | loss rate of the link 39 between the second client computer 36 and the first end node 40 |
| $L_5$ | loss rate of the link 41 between the second client computer 36 and the second end node 42 |
| $L_6$ | loss rate of the link 43 between the second client computer 36 and the third end node 44 |
| $L_7$ | loss rate of the link 45 between the third client computer 38 and the fifth end node 48 |
| $P_1$ | end-to-end loss rate between the server 32 and the first end node 40 |
| $P_2$ | end-to-end loss rate between the server 32 and the second end node 42 |
| $P_3$ | end-to-end loss rate between the server 32 and the third end node 44 |
| $P_4$ | end-to-end loss rate between the server 32 and the fourth end node 46 |
| $P_5$ | end-to-end loss rate between the server 32 and the fifth end node 48 |

For any given path between the server 32 and an end node 40, 42, 44, 46 or 48, the probability of packets reaching the end node (i.e., success rate) is equal to the product of the probability of packets passing through the individual links (l) along the path. Conversely then, the loss rates in the network 30 can be expressed by the equations in Table 2 below.

TABLE 2

$$(1 - l_1)*(1 - l_2)*(1 - l_4) = (1 - p_1)$$
$$(1 - l_1)*(1 - l_2)*(1 - l_5) = (1 - p_2)$$
$$(1 - l_1)*(1 - l_2)*(1 - l_6) = (1 - p_3)$$
$$(1 - l_1)*(1 - l_3)*(1 - l_7) = (1 - p_4)$$
$$(1 - l_1)*(1 - l_3)*(1 - l_8) = (1 - p_5)$$

In general, the number of unknowns may be larger than the number of equations, so there may not be a unique solution.

Figure 4:
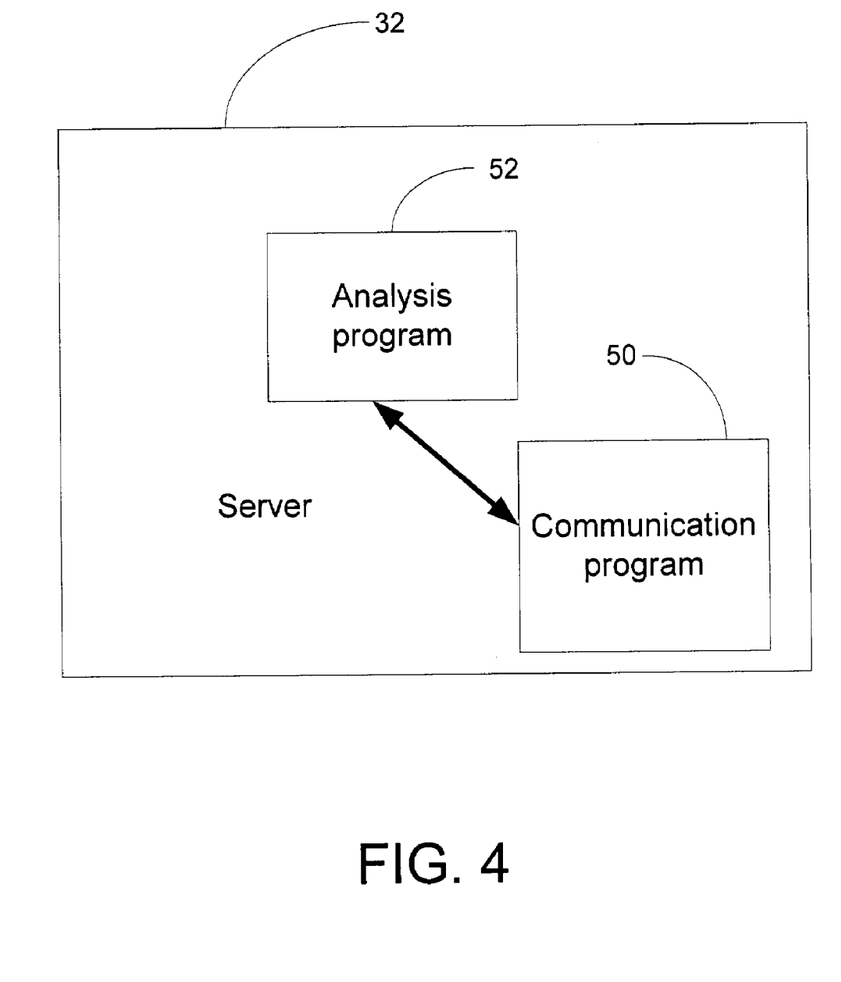
FIG. 4 illustrates programs executed by a server in an embodiment of the invention.

In keeping with the invention, an analysis program resides on a node of the network and detects packet traffic to and from a network server such as the server 32 in FIG. 3. Referring to FIG. 4, a block diagram shows the programs that execute on the server 32 according to one embodiment of the invention. The server 32 executes a communication program 50 that sends and receives data packets to and from other computers in the network 30 (FIG. 3). In a conventional fashion, the communication program 50 serves a variety of application programs (not shown) that also execute on one of the network nodes, including the server 32. An analysis program 52 also executes on one of the network nodes (possibly on the server node itself, otherwise on a node that can listen in on the server's network traffic). In FIG. 4 the analysis program is illustrated as executing on the server 32. The analysis program 52 receives data from the communication program 50 in order to carry out some or all of the steps of the invention. Specifically, in many embodiments of the invention (not illustrated), copies of the statistical analysis program 52 and communication program execute on multiple nodes of the network 30, which enables monitoring and analysis of communications on the network 30 from multiple locations.

The communication program 50 keeps track of how many data packets it sends to the each of the end nodes 40, 42, 44, 46 and 48 (FIG. 3). It also determines how many of those packets are lost en route based on feedback the program 50 receives from the end nodes. The feedback may take a variety of forms, including Transport Control Protocol (TCP) ACKs and Real-Time Control Protocol (RTCP) receiver reports. The communication program 50 is also capable of determining the paths that packets take through the network 30 by using a tool such as traceroute (a well-known Internet utility). Although the traceroute tool does involve active measurement, it need not run frequently or in real time. Besides traceroute, there are other ways to determine the paths that packets take, such as invoking the record route option (Ipv4) or extension header (Ipv6) on a small subset of packets. Thus, the communication program 50 gathers its data in a largely passive fashion.

In keeping with the invention, the analysis program 52 identifies excessively lossy links in the network 30 by performing a statistical analysis on the data it receives from the communication program 50. In performing the statistical analysis, the analysis program 52 does not necessarily infer a specific loss rate for each individual link of the network 30; instead, it may simply identify those links that are likely to be excessively lossy. In order to identify excessively lossy links, the analysis pro-gram 52 preferably employs one or more techniques that simplify the analysis. According to one technique, for those links of a network path that have no branches, the analysis program 52 collapses the links into a single "virtual link." Thus, for example, in the illustrated network connections in FIG. 3, the link 33 between the server 32 and the first client computer 34 is a virtual link actually comprising several different physical links, but without any branches points leading to any of the end nodes.

In another technique employed by the analysis program 52 to simplify its analysis, the loss rate of each link in the network 30 is assumed to be constant. This assumption has been shown to be reliable for the Internet, where packet loss rates remain relatively stable for tens of minutes. Since the analysis program 52 determines which links are likely to be excessively lossy, rather than the exact loss rates, this assumption is reasonable for the purpose of the intended analysis.

As previously discussed, the unknown loss rates of the network 30 of FIG. 3 can be expressed in the series of equations shown in Table 2. A general solution for that series of equations is expressed as $$l_L = \bigcup_{i \in L} l_i,$$

where L is the set of all links in the network 30. In conducting a statistical analysis on data received from the communication program 50, the analysis program 52 takes samples from the space of feasible solutions for the equations of Table 2. Based on those samples, the analysis program 52 makes inferences regarding which links of the computer network 30 are likely to be lossy. According to one embodiment of the invention, the analysis program 52 only considers those clients to whom the server 32 has transmitted at least a threshold number of data packets.

The general procedure carried out by the analysis program 52 according to one embodiment of the invention is as follows. First, the analysis program assigns a loss rate of zero to each link of the computer network 30. For each link i, the loss rate is bounded by the minimum of the observed loss rate at the clients downstream of the link. This boundary can be expressed as $l_i^{min}$. The analysis program 52 picks the loss rate, $l_i$, of the link i to be a random number between zero and $l_i^{min}$. The analysis program 52 defines the residual loss rate of a client to be the loss rate that is not accounted for by the links whose losses have already been assigned. Then, the analysis program 52 updates the residual loss rate of a client $C_j$ to $$1 - \frac{1 - p_j}{\prod_{i \in T'_j}(1 - l_i)},$$

where $T'_j$ is the subset of links along the path from the server to the client $C_j$ to which a loss rate has been assigned. The analysis program 52 repeats this procedure to compute the loss rate for the next level (in terms of the tree structure) of the network 30 by considering the residual loss rate of each client in place of its original loss rate. Once the loss rates have been computed for each link, the analysis program possesses one sample solution for $l_L$.

The analysis program 52 iterates the above-described procedure R times to produce R random solutions for $l_L$. Then the analysis program 52 draws conclusions based on the statistics of the individual link loss rates, $l_i$, across R random solutions. For example, if the average loss rate assigned to a link across all samples is higher than a threshold loss rate, the analysis program 52 concludes that the link is lossy.

The procedure described above is biased, in that the order in which links of the network 30 (FIG. 3) are chosen by the analysis program 52 (FIG. 4) affects the results of the analysis. As the analysis program 52 assigns loss rates to an increasing number of links, the loss rate boundaries on the remaining links get tighter. Thus, links that are picked early in the iterative process are likely to be assigned a higher loss rate than links picked later in the iteration. For example and referring to the network 30 illustrated in FIG. 3, the links closest to the server 32, which are picked early in each iteration, tend to be assigned the highest loss rates. This bias, however, may have a positive side effect in that it favors more parsimonious solutions (i.e., solutions in which the observed client loss rates are accounted for by assigning high loss rates to fewer links). For example, if many clients are experiencing high loss rates, an explanation that involves one shared, lossy link closer to the server is more plausible than one that involves a large number of independently lossy links.

The above-described analysis may be carried out on networks that are not organized as trees. In this regard, at any stage in an iteration, an arbitrary link may be picked, the boundary on its loss rate determined by examining all server-to-client paths traversing the link, and then randomly assigning a loss rate to the link within the boundary. Just as in the context of a tree topology, the analysis program 52 starts by picking links closest to the server and works its way toward the end nodes. The selection of links may occur in still other ways. For example, the analysis program 52 may randomly pick a link from the tree, assign it a loss rate, and update the loss thresholds for the other links. To simplify the following discussion, however, the analysis program 52 is assumed to assign link loss rates starting from the top of a tree.

In the following paragraphs, a more specific example of how the above-described analysis may be implemented is described. In this example, the server 32 (FIG. 3) has measured the end-to-end loss rates for the end nodes and has determined them to be as follows: $p_1=0.07$, $p_2=0.09$, $p_3=0.1$, $p_4=0.02$, $p_5=0.05$. The analysis program 52 chooses random loss rates starting with the links that are the closest to the server 32. In the network shown in FIG. 3, the link that is closest to the server 32 (link 33) has a loss rate that is represented by $l_1$. Since $l_1$ cannot be greater than the loss rate being experienced by any of the client computers $p_1$-$p_5$, the space from which the analysis program 52 chooses the loss rate $l_1$ is bounded as follows: $l_1 \leq \min(p_1, p_2, p_3, p_4, p_5)$. Thus, $l_1$ is less than or equal to 0.02. Next, the analysis program 52 chooses a random value for $l_1$ such that it meets the imposed constraint. Assume that the random value chosen by the analysis program 52 for $l_1$ is 0.005. Based on this loss rate for $l_1$, the analysis program 52, updates the residual loss rate of the first, second, third, fourth and fifth end nodes 40, 42, 44, 46 and 48 as follows:

$p_1'=1-(1-p_1)/(1-l_1)=1-(1-0.07)/(1-0.005)=0.0653$ $p_2'=1-(1-p_2)/(1-l_1)=1-(1-0.09)/(1-0.005)=0.0854$ $p_3'=1-(1-p_3)/(1-l_1)=1-(1-0.1)/(1-0.005)=0.095477$ $p_4'=1-(1-p_4)/(1-l_1)=1-(1-0.02)/(1-0.005)=0.0151$ $p_5'=1-(1-p_5)/(1-l_1)=1-(1-0.05)/(1-0.005)=0.0452$

These values are then used by the analysis program 52 to set constraints for the links that are the next closest to the server 32 (links 35 and 37 in FIG. 3) whose loss rates are represented by $l_2$ and $l_3$. In this example, $l_2 \leq \min(p_1', y\ p_2', p_3')=0.0653$ and $l_3 \leq \min(p_4', p_5')=0.0151$. The analysis program 52 then randomly chooses values for $l_2$ and $l_3$. In the first iteration, it is assumed that the randomly chosen values for $l_2$ and $l_3$ are:

$l_2=0.03$ $l_3=0.01$

Based on the currently assigned values of $l_1$, $l_2$, $l_3$, the analysis program 52 updates the residual loss rate of the first, second, third, fourth and fifth end nodes again as follows:

$p_1'=1-(1-p_1)/((1-l_1)*(1-l_2))=1-(1-0.07)/((1-0.005)*(1-0.03))=0.0364192$ $p_2'=1-(1-p_2)/((1-l_1)*(1-l_2))=1-(1-0.09)/((1-0.005)*(1-0.03))=0.0571414$ $p_3'=1-(1-p_3)/((1-l_1)*(1-l_2))=1-(1-0.1)/((1-0.005)*(1-0.03))=0.0675025$ $p_4'=1-(1-p_4)/((1-l_1)*(1-l_3))=1-(1-0.02)/((1-0.005)*(1-0.01))=0.005127$ $p_5'=1-(1-p_5)/((1-l_1)*(1-l_3))=1-(1-0.05)/((1-0.005)*(1-0.01))=0.035582$

The analysis program 52 accounts for these residual loss rates by the last-hop links. In the illustrated embodiment, the "last-hop links" are the links 14, 14, 16, 17, and 18, which are the last links along the path from the server 32 to each client. Therefore, the analysis program designates $l_4$, $l_5$, $l_6$, $l_7$ and $l_8$ for the first iteration to be as follows:

$l_4=0.0364192$, $l_5=0.0571414$, $l_6=0.0675025$, $l_7=0.005127$, and $l_8=0.03582$.

The analysis program 52 repeats the foregoing process until it obtains a number of sample solutions for the problem expressed by the equations in Table 2. The number of samples taken may vary according to different embodiments of the invention. Taking about 500 or about 1000 samples is known to be effective. A set of ten sample solutions are set forth in Table 3 below, which helps illustrate the statistical analysis that is performed according to various embodiments of the invention:

TABLE 3

| Iteration# | $l_1$ | $l_2$ | $l_3$ | $L_4$ | $l_5$ | $l_6$ | $l_7$ | $l_8$ |
|---|---|---|---|---|---|---|---|---|
| 1 | 0.005 | 0.03 | 0.01 | 0.0364192 | 0.0571414 | 0.0675025 | 0.005127 | 0.03582 |
| 2 | 0.005016 | 0.030439 | 0.004846 | 0.035967 | 0.056699 | 0.067065 | 0.010263 | 0.040561 |
| 3 | 0.002295 | 0.002663 | 0.014585 | 0.065372 | 0.085471 | 0.095521 | 0.003208 | 0.033722 |
| 4 | 0.006384 | 0.030156 | 0.005145 | 0.034922 | 0.055676 | 0.066053 | 0.008602 | 0.038951 |
| 5 | 0.013820 | 0.014687 | 0.001530 | 0.042910 | 0.063493 | 0.073784 | 0.004744 | 0.035211 |
| 6 | 0.005828 | 0.012136 | 0.009232 | 0.053056 | 0.073420 | 0.083602 | 0.005069 | 0.035526 |
| 7 | 0.001924 | 0.038712 | 0.008909 | 0.030683 | 0.051529 | 0.061951 | 0.009285 | 0.039613 |
| 8 | 0.003619 | 0.002245 | 0.016242 | 0.064523 | 0.084640 | 0.094699 | 0.000202 | 0.030809 |
| 9 | 0.007768 | 0.043188 | 0.005862 | 0.020412 | 0.041479 | 0.052012 | 0.006504 | 0.036917 |
| 10 | 0.017839 | 0.015766 | 0.000863 | 0.037940 | 0.058629 | 0.068974 | 0.001338 | 0.031909 |

The analysis program 52 then conducts a statistical analysis on the sample solutions. There are several possible ways in which this statistical analysis can be conducted. In one embodiment, the average loss rate is computed over all samples, and if the average for a given link is larger than a threshold, the statistical analysis program 52 designates the link as lossy. The level at which this threshold is set depends on a variety of factors, such as the value of the loss rate that is deemed to adversely impact the application that a network user wishes to run. In the previous example, if the threshold is set to be a five percent (5%) loss rate, the statistical analysis program designates the links 42 and 43 as lossy, since the average of their ten samples of $l_5$ and $l_6$ are both above five percent.

In another embodiment of the invention, the statistical analysis program 52 determines whether a certain percentage of the samples exceeds a threshold. For example, if 90 percent of a link's loss rate samples are over the chosen threshold, the link can be deemed to be lossy. Using this test, the statistical analysis program 52 would once again designate the links 42 and 43 as lossy.

In view of the many possible embodiments to which the principles of this invention may be applied, the embodiments described herein with respect to the drawing FIGS. 1-4 are meant to be illustrative only and are not intended to be limiting. For example, those of skill in the relevant art of this invention will recognize that the elements of the illustrated embodiments may be implemented in software or hardware and that the illustrated embodiments can be modified in arrangement and detail without departing from the essence of the invention. Therefore, the invention as described herein contemplates all such embodiments as may come within the scope of the following claims and equivalents thereof.

We claim:

1. A method for identifying lossy links in a computer network tree, the computer network tree having a plurality of links, the method comprising:
   (a) choosing a loss rate for a link of the plurality of links, the loss rate either being dictated by loss rates chosen for other links of the plurality of links, or being chosen from a range of numbers between, and including, zero and the minimum loss rate observed at one or more end nodes of the computer network tree, the link being along a path in the computer network tree to the end nodes;
   (b) calculating a residual loss rate for one or more end nodes;
   (c) repeating steps (a) and (b) for each link down the computer network tree by using the calculated residual loss rate from the previous link as the upper limit for the range of numbers, until a loss rate for each link has been either chosen at random or dictated by the loss rates of other links;
   (d) conducting a statistical analysis using the loss rate for each link; and
   (e) determining which of the links of the plurality of links are lossy based on the statistical analysis.

2. A computer-readable medium having stored thereon computer-executable instructions for performing the method of claim 1.

3. The method of claim 1, further comprising:
   (f) repeating steps (a), (b) and (c) over a number of iterations, wherein step (d) comprises averaging the loss rates for each link over the number of iterations.

* * * * *